May 12, 1925.
C. R. SMITH ET AL
METER BOX
Filed Jan. 2, 1925
1,537,325
2 Sheets-Sheet 1
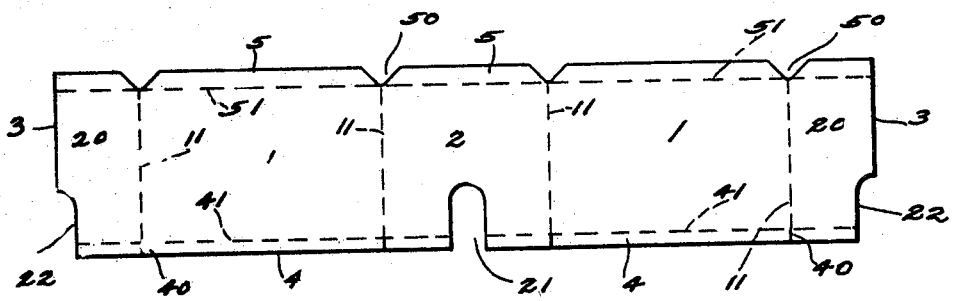
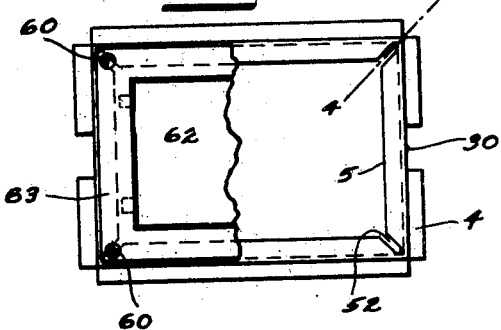
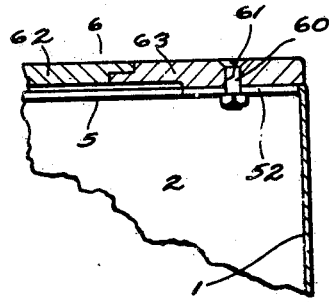
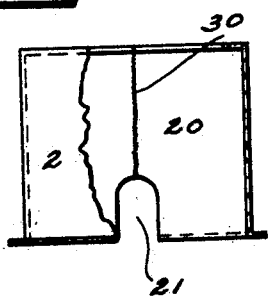
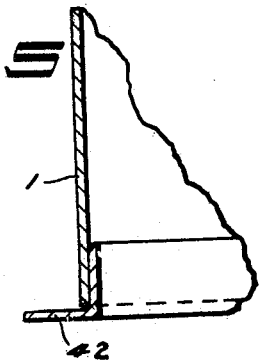
INVENTORS
Cecil R. Smith
William E. Smith
BY
H. L. & C. L. Reynolds
ATTORNEYS May 12, 1925.
C. R. SMITH ET AL
METER BOX
Filed Jan. 2, 1925
1,537,325
2 Sheets-Sheet 2
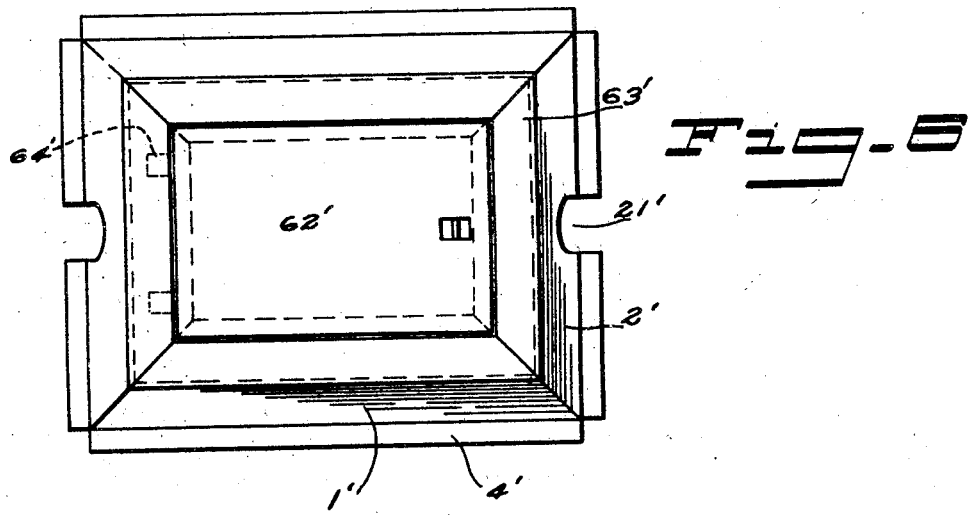
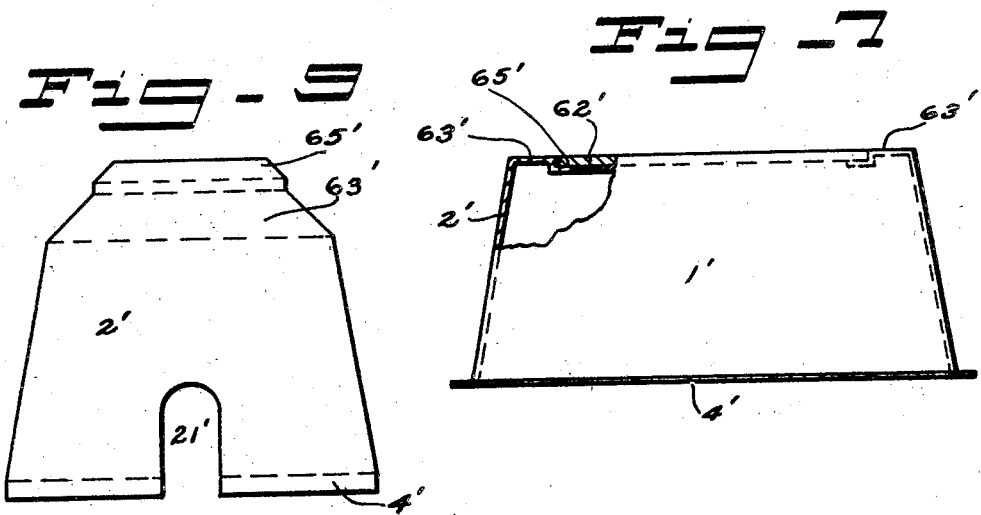
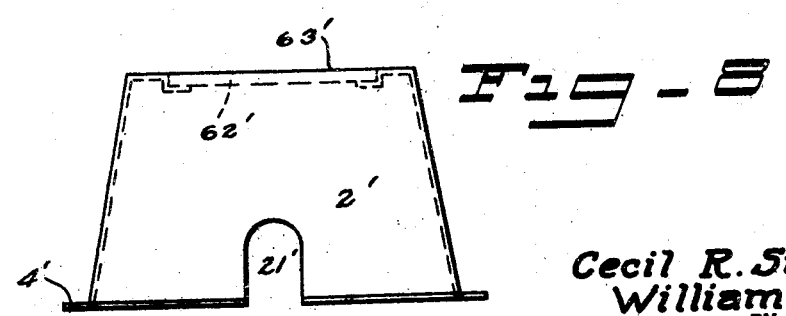
INVENTORS
Cecil R. Smith
William E. Smith
BY
ATTORNEYS Patented May 12, 1925.

1,537,325

UNITED STATES PATENT OFFICE.

CECIL R. SMITH AND WILLIAM E. SMITH, OF SEATTLE, WASHINGTON.

METER BOX.

Application filed January 2, 1925. Serial No. 74.

*To all whom it may concern:*

Be it known that we, CECIL R. SMITH and WILLIAM E. SMITH, citizens of the United States of America, and residents of the city of Seattle, in the county of King and State of Washington, have invented certain new and useful Improvements in Meter Boxes, of which the following is a specification.

Our invention relates to meter boxes such as are intended for enclosing and protecting meters which are generally placed in the ground to meter the water supplied to each consumer in a city.

It is an object of the present invention to produce a meter box which is durable, cheap in first cost, comparatively light, easily handled, without breakage, and convenient for storage.

A further object is the provision of such a box which may be employed with covers intended originally to be employed with meter boxes of wood.

It is also an object to provide a meter box which, while not larger than meter boxes of wood or concrete now commonly employed, yet leaves slightly more room for working at the meter or its connections.

Our invention comprises the improved meter box as shown in the accompanying drawings, and as more particularly described in the following specification and defined by the claims terminating the same.

The accompanying drawings show two forms of our meter box, one being more particularly designed for use with existing cast iron covers and the other being a slightly more expensive but more durable type of said meter box, formed entirely of sheet metal.

Figure 1 is an elevation of the blank from which one form of box is formed.

Figure 2 is a plan view of the box completed, parts of the cover being broken away.

Figure 3 is an end elevation of this type of box, a part of the adjacent end being broken away and the cover being omitted.

Figure 4 is a section on line 4—4 of Figure 2.

Figure 5 is a section through a side and bottom flange of a slightly modified construction.

Figure 6 is a plan view of the second form of box.

Figure 7 is a side elevation thereof and Figure 8 an end elevation.

Figure 9 is a layout of one end of this form of box.

Previous meter boxes have been largely made of wood and of concrete. Wooden boxes in intimate contact with and buried in earth, which is liable to be damp, have an ordinary life of from one year to not exceeding three years. Their first cost, while fairly low, is more than compensated for by the necessity for frequent replacements, and the cost of replacements is increased considerably where the box is imbedded in or surrounded by concrete, as is often the case, so that the concrete must be torn up to enable the box to be replaced. Concrete boxes have been employed which have a longer life than the wooden boxes when in place, but these are heavy and difficult to handle, they will not nest and consequently cannot be stored readily, and unless so heavily reinforced as to be practically prohibitive in cost are fragile. The breakage in such boxes in ordinary use amounts to as high as ten or fifteen per cent which if figured into the cost of the concrete boxes renders them quite expensive. Our box, therefore, is designed to replace such boxes, to be durable, and while approximately the same as the wooden boxes in first cost, to be far the cheapest in the end, for the reasons that its life should be in the neighborhood of twenty-five years, thus requiring little if any replacement, that it will not break in handling nor become so deformed that it may not be used, thus eliminating loss from breakage, and that it may be readily stored or quickly and conveniently made up from materials always locally available.

In making this box we prefer to employ sheet steel, No. 10 gauge being preferred, and from it form an enclosure, generally of four sides, with the top and bottom open. One form is shown in Figures 1–5 inclusive, this being designed to receive the cast iron covers now largely employed in connection with wooden boxes, and another form made entirely of sheet steel being illustrated in Figures 6–9. In the first form the box is made with vertical sides, being cut from a strip of metal in the manner illustrated in Figure 1. Herein the sides 1 and one end 2 are laid off intermediate the ends of the strip and two halves 20 of the opposite end are laid off at the opposite ends of the strip. It is customary to form slots as 21 in the opposite ends of the meter boxes to receive the two pipes with which the meter is connected. In forming the two halves of the end 20 we cut out a half of a slot in each half of the end, as indicated at 22. When the enclosure is completed by bending along the lines 11 which form the corners, the ends 3 of the strip adjoin to form a completed slot 21, as is indicated in Figure 3. These adjoining ends 3 are connected suitably, preferably by welding, as indicated at 30 in Figure 3. This locates the weld along the shortest possible line, thus cutting down this considerable item of expense in their manufacture.

The box thus formed is a four-walled enclosure, open at its top and bottom. To give it sufficient footing flanges 4 may be turned outwardly from the bottoms of the walls, these being formed merely by slitting the edge of the blank as indicated at 40, and by folding the flanges thus formed along the lines 41. To support the cover, flanges 5 are likewise provided at the top of the walls, and to form these flanges, V-shaped notches 50 are cut in the blank so that the flanges 5 when folded inward along the line 51, will substantially meet along diagonal lines.

The ends of the flanges 5 do not quite meet but are left spaced to form slots 52, as best shown in Figure 2, which extend angularly to each of the adjoining sides of the enclosure and which receive bolts 60 which pass through holes 61 provided for their reception in the corners of the cover 6. By means of the slots 52 the four bolts 60 can be made to register with the corresponding slots, whereas if holes only were provided in the flanges 5 for the reception of the bolts 60, it would often be found that the holes in the cover and in the flanges did not properly register. The slots provide sufficient freedom of movement and elasticity to secure proper registration of the holes 61 therewith. The slots might be formed parallel to a side of the enclosure, but this would provide rigid spacing between them and would therefore be undesirable for the same reason as the holes are undesirable. It is for this reason that they are diagonally disposed.

In referring to the cover this term is intended to include not only the movable cover proper, indicated at 62, but the ring 63, which directly supports this cover proper and which is itself secured upon the top of the enclosure. The support of the cover proper 62 upon the ring is illustrated in Figure 4, but any preferred form may be employed. It will be understood that Figure 4 illustrates the connection to the sheet steel meter box of the cast iron cover now largely employed with wooden meter boxes and which is now carried in stock by many municipalities and water companies.

This form of box is designed to be cut from standard widths of steel plate if necessary, for emergency construction. The height of such boxes should be approximately eleven inches and with a flange 5 of a width of one inch the blank may be formed from a twelve inch width of plate which is readily cut from standard widths. The footing flange 4 may in such cases be supplied by spot welding or otherwise securing a bedstead angle 42 to the bottom of the walls, such angles being commonly available locally. This form is illustrated in Figure 5.

The box shown in Figures 6, 7, 8 and 9, is slightly more expensive than the box just described, but by reason of its flaring sides permits a little greater freedom of action in working upon the meter or the pipes connected thereto. In this form the sides 1' and the ends 2' are separately sheared from steel plates, the slots 21' being cut in the ends and footing flanges 4' being bent from the bottoms of the side walls 1' and from the end of the walls 2' if desired. The adjoining ends of the walls in this form as in the first form, may be joined by welding, the adjoining ends in this instance being the corners of the enclosure. Likewise the cover, or the ring 63' forming a part thereof, may be formed integrally with the walls 1' and 2', being flanged over into a horizontal plane. Recessed shoulders 65' may be formed at the inner edge of the ring 63' to support the cover proper 62', the parts forming these shoulders being bent from the blank forming the wall and adjacent portion of the ring 63'. The cover proper 62' is hinged to the ring 63' in any ordinary manner, the hinges being indicated at 64'. The entire enclosure is thus completed by four welds at the corner.

An advantage of the latter form lies in the convenience with which the assembled meter box can be nested with others for storage. This is ordinarily not possible nor desirable with wooden boxes, these being made up on the job from previously cut planks, and is not practised with concrete boxes for several reasons, one being that the thickness of the walls will not permit them to fit within one another, and another being that the concrete boxes, not being reinforced, have not sufficient strength to support any considerable load.

What we claim as our invention is:

1. A meter box comprising a plurality of walls bent from a strip of sheet metal to form an enclosure open at its top and bottom, the ends of said strip meeting in an end wall of the enclosure, pipe-receiving slots extending upward from the bottom of the end walls, the slot at one end coinciding with the adjoining ends of the strip, and the adjoining ends above such slots being connected by welding, and means for supporting a cover upon the top of said enclosure.

2. A meter box comprising a plurality of walls of sheet metal completing an enclosure open at its top and bottom, flanges extending inward at the top of the several walls, adjoining flanges being spaced at the corners to provide bolt-receiving slots, a separable ring and cover closing the top of said enclosure, the ring having holes registering with said slots, and bolts passing through said holes and slots to secure the ring to the enclosing walls.

3. A meter box comprising four walls of sheet metal completing an enclosure open at its top and bottom, flanges extending inward at the top of the several walls, adjoining flanges being spaced at the corners to provide diagonally-extending bolt-receiving slots, a cover closing the top of said enclosure, and having holes in its corners registering with said slots, and bolts passing through said holes and slots to secure the cover to the enclosure.

Signed at Seattle, King County, Washington, this 26th day of December, 1924.

CECIL R. SMITH.
WILLIAM E. SMITH.